United States Patent

Tsao

[15] 3,680,039
[45] July 25, 1972

[54] APPARATUS FOR DETECTING MOVABLE OBJECTS

[72] Inventor: Thomas K. Tsao, 4306 Sarasota Place, Beltsville, Md. 20705

[22] Filed: Oct. 8, 1970

[21] Appl. No.: 79,016

[52] U.S. Cl. ............................................. 340/1 R, 340/1 T
[51] Int. Cl. ........................................................... G01s 9/66
[58] Field of Search .................................. 340/1 R, 1 T, 38 S

[56] References Cited

UNITED STATES PATENTS 3,102,261  8/1963  Wippert ............................. 340/1 R X Primary Examiner—Richard A. Farley
Attorney—Walter S. Pawl

[57] ABSTRACT

Apparatus for detecting objects by means of ultrasonic waves and echos reflected from objects within a detection zone, the apparatus including a transmitter for generating electric energy at ultrasonic frequencies; means forming pulses of the electric energy; timing means for selectively determining the frequency of said pulses; transducer means for converting electric pulses into ultrasonic pulses and ultrasonic pulses into electric pulses and for projecting said ultrasonic pulses along a narrow beam into a detection zone and receiving echo pulses from said detection zone; receiver means connected to said transducer for detecting and amplifying said electromagnetic pulses, control means connected to said receiver for indicating the presence of objects in the detection zone, gating means in said connection for limiting the pulses transmitted to said control device to those reflected from within the detection zone and means for simultaneously and selectively controlling the power output of the transmitter and the gain of the receiver.

2 Claims, 4 Drawing Figures

PATENTED JUL 25 1972                3,680,039

INVENTOR

THOMAS K. TSAO

BY Walter S. Pask

ATTORNEY

INVENTOR
THOMAS K. TSAO

BY Walter S. Paul

ATTORNEY

APPARATUS FOR DETECTING MOVABLE OBJECTS

The present invention relates to an ultrasonic detector apparatus of vehicles within a detection zone or moving through said zone transverse to a roadway. It is an improvement over the invention disclosed in the patent to Tsao et al., U.S. Pat. No. 3,383,480 issued May 7, 1968.

The prior invention is directed to a method of detecting pulses of ultrasonic energy projected into a detection zone and reflected as echo pulses by objects within and without the detection zone, which are amplified, and used as an indication of the presence of said objects.

The present invention is directed to an improvement in the apparatus for carrying out said method. Detection zones are not always four lanes wide, nor are the lanes always arranged side by side in abutting relation. In modern day design and construction it is the practice to separate the lanes of traffic as much as possible, particularly those lanes that carry oppositely moving traffic. As a consequence, detecting apparatus designed and constructed for use in one detection zone will not operate satisfactorily in other detection zones where the conditions are different.

Also, apparatus which has a fixed pulse frequency is limited in responsiveness over a fixed period during each cycle. The response of this apparatus may be excessive in the case where the detection zone is but one lane wide and it may be inadequate where the detection zone is three, four or six lanes wide. In the first instance, the apparatus would receive echo pulses from beyond the detection zone and render the operation of the apparatus erratic. In the second instance the apparatus would not reach out to the full extent of the zone and there would be objects that would not be counted. These defects in the apparatus cannot be corrected by mere adjustment of the receiver gain.

The apparatus disclosed in the prior patent is by this invention improved for operation at different pulse frequencies, which will enable the range of the detecting apparatus to be adjusted to the different dimensions of the detecting zone. Provisions are thus made for changing the pulse width and also the period length of period in which the receiver can be gated to its "on" state. Also, improvement is made whereby much of the noise which enters the receiver and is amplified can be eliminated at its output by a greater range in the adjustment of gating period.

The apparatus in said prior patent also is limited in adjustment of sensitivity to controlling the gain of the receiver. By this invention the range over which the sensitivity of the apparatus may be adjusted may be increased by the simulteous control of the power output of the transmitter and the gain of the receiver. These improvements provide for greater universality of use of the apparatus for the purpose for which it is designed.

It is therefore an object of the invention to improve the universality of utility of an ultrasonic detector apparatus by the provision of means within the apparatus for selectively adjusting the range capabilities thereof.

It is another object of the invention to reduce the noise level at the output of the receiver to reduce the erratic operation of the counting mechanism.

A still further object is to improve and increase the range of adjustment of sensitivity of the apparatus to further adjust the apparatus to different enviromental conditions of the detection zones.

Additional objects of the invention will become apparent from the specification and the attached drawings wherein:

FIG. 1 is a schematic drawing of the apparatus shown in block diagram;

FIG. 2 a schematic wireing diagram of the transmitter, receiver, transducer and timing portions of the apparatus;

Figure 1:
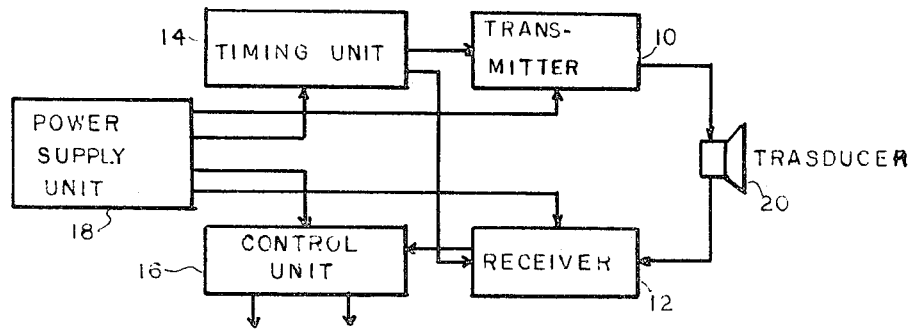

In FIG. 1 is disclosed the apparatus for detecting vehicular traffic as comprising a transmitter 10 operatively connected to an ultrasonic transducer 20 and a receiver 12 also connected to the transducer 20. A timing unit 14 is connected to the transmitter 10 and the receiver 12 for controlling the frequency of the pulses from the transmitter and for timing the control of the gating means of the receiver. The receiver 12 has its output connected to the control unit 16 in which it is used to produce the desired indication. The power unit 18 is connected to the timing unit 14, the transmitter 10 the receiver 12 and the control unit 16 to supply power thereto.

The transmitter develops an electromagnetic frequency in the ultrasonic range of frequencies which is pulsed periodically by the timing unit. These pulses are converted in the transducer 20 into mechanical waves having ultrasonic frequencies and directed and focussed as pulses into the detection zone. In the detection zone the pulses engage objects therein and are reflected, some of the reflected energy is picked up by the transducer 20 and converted to electromagnet pulses to be conveyed to the receiver. If the receiver 12 is activated at the instant that such electromagnetic pulses arrive at its input, the pulses are amplified and fed to the control unit 16 wherein it is used to produce an indication. Should the receiver be deactivated at the time the electric pulse arrives at its input, its energy is not amplified and there will be no output to the control unit 16. The receiver is deactivated during the first part of each cycle to eliminate the effect of the transmitter output upon the receiver and also to render the receiver insensitive to reflections or echos that come from objects nearer to the apparatus than the detection zone. The receiver 12 is activated by the gating means for a period just adequate for the transmitted pulses to reach the far side of the detection zone and return to the input of the transducer and the receiver. At the end of this time period it is desired that the receiver be again deactivated to prevent reflected pulses from objects beyond the detection zone from being amplified and fed to the control unit 16. Thus, by limiting the period in which the receiver is activated, reflected pulses or echos, from outside the detection zone can be materially eliminated in the receiver.

Those reflections or echos from the detection zone that come from other objects than those of primary interest as for example from vehicles, are to a large extent due to multiple reflections from structures along side the detection zone. They are of much lower amplitude than the echos coming from the vehicles. The effect of these low amplitude pulses can be minimized by the simultaneous adjustment of the power output of the transmitter 10 and the gain of the amplifier in the receiver. The power and gain are reduced just sufficient to eliminate the effect of the echos coming from these other sources.

Figure 2:
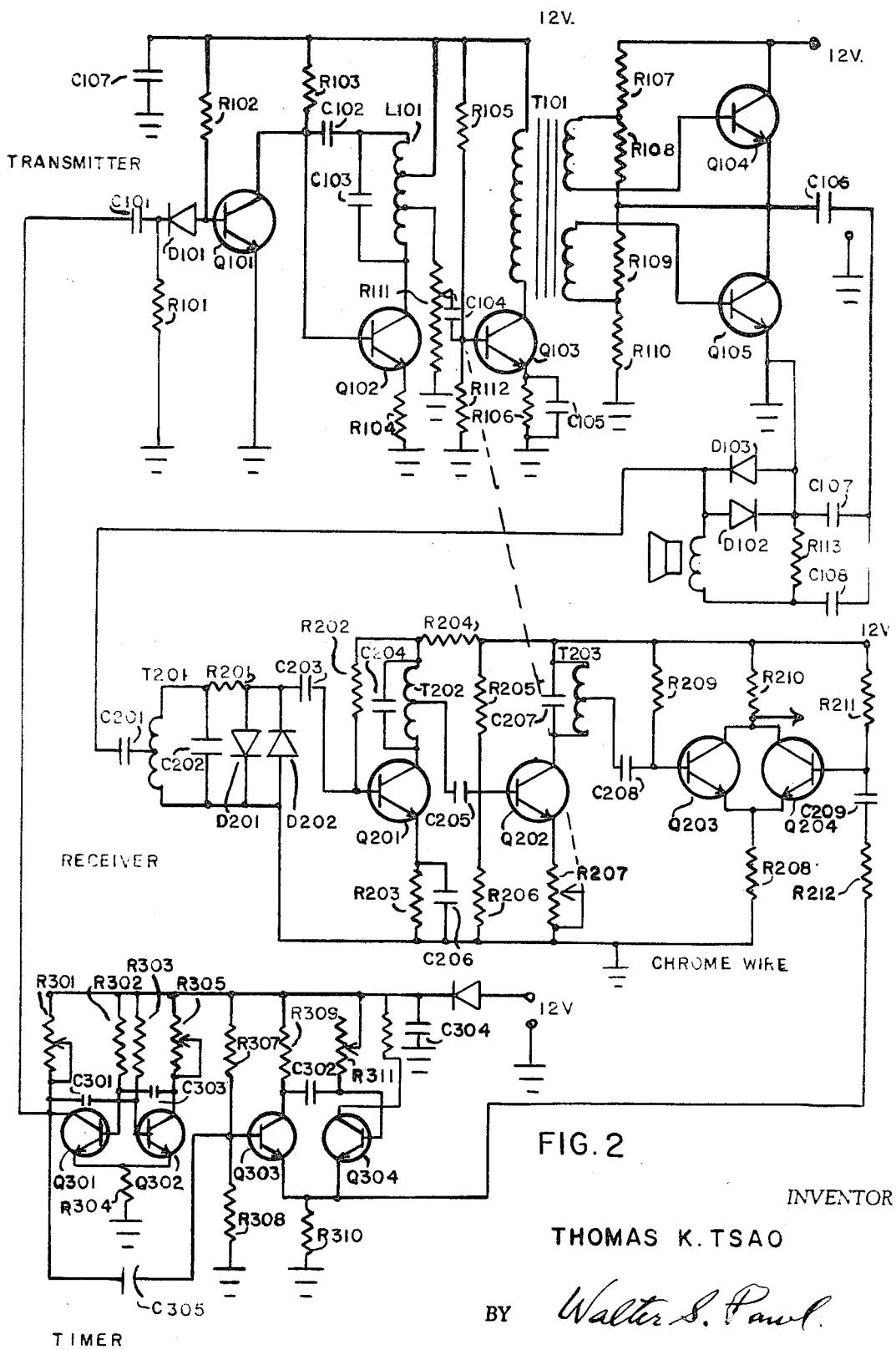

Refering to FIG. 2, it shows the transmitter, receiver and timing unit in a schematic diagram. The transmitter 10 includes an oscillator Q102 having a tank circuit including a capacitor 103 and induction coil L101. A feedback circuit is provided by capacitor C102. The base of the transistor Q102 is biased to cutoff by a voltage applied thereto by resistor R103 and resistor R 104. The input from the timing unit, later to be described, is applied through the capacitor C101 across the resistor R 101. During the interval that the timing unit produces a minimum voltage, a minimum voltage is applied at the juncture of the capacitor C101 and Resistor R101. This enables the diode D101 connecting the juncture and the base of transistor Q101 to conduct reducing the bias on the transistor Q101 so that it conducts to remove the bias from the oscillator Q102. The oscillator Q102 then oscillates at an ultrasonic frequency as determined by the value of the components in its circuit. The output of the oscillator Q102 is connected to the base of the Driver transistor Q103 through a potentiometer R112 and Capacitor C104 The output of the driver Q103 is connected through transformer T101 to the power amplifier comprising transistors Q104 and Q105. The voltage divider comprising of resistors R107, R108, R109 and R110 provides the proper bias voltages to the transistors Q104 and Q105.

The potentiometer R112 provides for control of the magnitude of output of the oscillator Q102 that is fed to the driver and thus also controls the power output of the transmitter.

The output of the transmitter is connected through capacitors C106, C107 and C108 across the resistor R113 of the transducer 20. The coil of the transducer is connected across this resistor R111 by diodes D102 and D103. The coil arranged in a conventional manner relative to a diaphram or similar device causes it to vibrate the diaphram at ultrasonic frequencies during the period of said pulses and be projected outwardly along a very narrow path toward the detection zone, which in the present example traverses multiple lane of traffic of a roadway. The pulses of ultrasonic energy impinging upon vehicles in the detection zone will be in part reflected and part of this reflected energy is picked up by the transducer and converted into electromagnetic energy pulses.

The output from the transducer is connected through a pair of diodes D102 and D103 and a capacitor C201 to the input of the receiver. The input of the receiver includes a limiting network to prevent overloading of the receiver by strong signals. The limiting network comprises the transformer T201, capacitor C202 in parallel with the transformer T201, Resistor R201 in series with a pair of diodes D201, D202 connected in parallel with the transformer T201. The network is connected by capacitor C203 to the base of the transistor Q201 constituting the first stage of the receiver. The transister Q201 is biased by resistors R202 and R203 and has an output circuit comprising capacitor C204 and transformer T202. Transformer T202 is connected through capacitor C205 to the base of transistor Q202 constituting the second stage of the receiver. This transistor Q202 is biased by resistors R205 and R206 forming a potential divider connected across a source of voltage. A potentiometer R207 in the collector circuit of the transistor Q202 controls the gain of the receiver by regulating the amplitude of the current variations in the emitter-collector circuit of the transistor Q202. The output of the transistor Q202 is connected through transformer T203 shunted by capacitor C206 and capacitor C208 to the base of transistor Q203.

Transistors Q203 and Q204 form a gating network for the receiver output, whereby the output will be connected to the control unit only during predetermined periods of each cycle. The operation of the gating circuit depends on the presence and absence of the gating pulse from the timing unit.

A bias is applied on the base of transistor Q204 through resistors R211 and R208. The gating signal is also applied to the base electrode of the transistor Q204 through resistor R212 and capacitor C209. While no gating pulse is present at the base of the transistor Q204, the transistor Q204 conducts thus shorting the emitter collector circuit of transistor Q203 whereby no pulse will be transmitted to the control unit 16. When there is a gating potential applied through resistor R212, Transistor Q204 becomes non-conductive to terminate the short circuit of transistor Q203 rendering it responsive to the pulse voltages applied to its base terminal. This produces a pulsating voltage at the juncture of resistor R210 and the transistor Q203 that is fed to the control unit.

The gating pulse applied to the gate transistor Q204 is produced by the timing unit also shown in FIG. 1. The timer includes an astable multivibrator for providing gating pulses to the transmitter and to the receiver. It includes two transistors Q301 and Q302 connected at their emitter terminals through a common resistor R304 to ground and at their collector terminals connected respectively through potentiometers R301 and R305 to a source of bias voltage (12 volts in this example). The base terminals of the transistors Q301 and Q302 are respectively connected through resistors R302 and R303 to the source of bias voltage. The collector terminal of transistor Q301 is connected through capacitor C301 to the base terminal of the transistor Q302, which in turn is connected from its collector terminal through capacitor C303 to the base terminal of transistor Q301. These capacitors C301 and C303 and potentiometers R301 and R305 control the frequency of operation of the multivibrator. Because the potentiometers are capable of independent selective adjustment of their resistances, the frequency is selectively adjustable. Also since the potentiometers are independently adjustable, the dwells of the transistors in their conductive states can also be adjusted, wherein there will be a minimum voltage for a short period of the cycle and a maximum voltage for a longer period of the cycle.

When transistor Q301 conducts there will be a low voltage on its collector terminal by reason of the voltage drop through potentiometer R301. Simultaneously, transistor Q302 will be cut off and the voltage on its collector will be substantially equal to the bias voltage as there will be substantially no voltage drop across the potentiometer R305.

When transistor Q301 is first turned on, its collector terminal becomes substantially equal to its emitter in voltage. This reduces the voltage on the capacitor terminal of the capacitor C301 connected thereto to the same voltage. The other terminal of the capacitor C301 is connected to resistor R303 and to the base terminal of transistor Q302. Capacitor C301 now charges up to the potential applied thereacross. Its rate of charge is regulated by the setting of the potentiometer R301, as it determines the voltage drop across the capacitor C301. This increases the bias voltage on the base of transistor Q302 while the capacitor R303 is charged to the potential across the Transistor Q302. This produces a collector to base bias in the forward direction with the transistor Q302 becoming conductive and discharging the capacitors C303 and C301. The discharge of capacitor C303 produces a voltage drop on the base terminal of transistor Q301 while at the same time the collector to emitter voltage is reduced, thus causing the transistor Q301 to become nonconductive. When the capacitors are discharged and recharged to the opposite polarity the multivubrator again switches in conductivity to transistor Q301 and the cycle is complete. The potentiometers R301 and R305 respectively control the voltage drops applied respectively to the capacitors C301 and C303. The potential at the collector of the transistor Q301 is continuously applied to the capacitor C101 of the transmitter to key the oscillator thereof into oscillation, to build up the energy in its tank circuit.

The collector terminal of the transistor Q301 is also connected through a variable capacitor C305 to the base terminal of the transistor Q303 that is biased by voltage divider R307, R308 to cutoff. Its collector terminal is connected through resistor R309 to the bias voltage and its emitter terminal is connected through resistor R310 to ground. The collector terminal of transistor Q303 is also connected through capacitor C302 to the base terminal of the transistor Q304. Its base terminal is also connected through a potentiometer R311 to the bias voltage source. The collector of transistor Q304 is connected through resistor R312 to the source of bias voltage and the emitter terminal via resistor R310 to ground and also to resistor R212 of the receiver.

When the low voltage is applied to the variable capacitor C305 it is charged due to the difference in potential between the potential of the collector of the transistor Q301 and the potential of the base of transistor Q303. The rate of charge depends on the voltage difference and the adjusted capacitance of the variable capacitor C305. The charging rate causes resistor R306 to conduct to produce a voltage drop on the base of the transistor Q303 relative to the voltage on its collector. This produces a forward bias between the base and collector of the transistor Q303 and it is triggered to conductivity to lower the potential on its collector terminal. This lowering of the voltage is transmitted to the base of the transistor Q304 to produce a forward bias between the collector and base thereof to cause it to conduct and to produce an increase in voltage at its emitter terminal which is applied through resistor R212 of the receiver to open the output gate of the receiver for such duration as the increase in voltage persists.

The capacitor C303 and the potentiometer R311 operate as a timing circuit in the control of the duration of the output voltage to the gate of the receiver, by controlling the voltage on the base of the transistor. When transistor Q303 ceases to conduct by reason of capacitor C305 becoming fully charged and the base voltage becoming equal to the collector voltage, transistor Q304 is conducting. Capacitor C302 first charges by reason of the difference in potential being in a leftward direction as viewed in the drawing. When transistor Q303 ceases to conduct and transistor Q304 is conducting the capacitor C302 is charged in a direction to maintain the voltage on the base of transistor Q304 at the voltage necessAry to maintain a forward bias between the collector and the base of transistor Q304 and maintain the conductivity thereof until the capacitor C302 is discharged and recharged in the opposite direction due to the difference in potential thereacross, or toward the right as viewed in the drawing. Once the capacitor C302 becomes charged in the opposite direction to lower the voltage on the base sufficiently to remove the forward bias on the transistor Q304 it will cease to conduct. This removes the gating voltage from the receiver. The potentiometer R311 thus controls the rate of discharge of capacitor and its charging in the opposite direction and the length of the portion of the period of operation of the multivibrator that the gating voltage is applied to the receiver.

Figure 3:
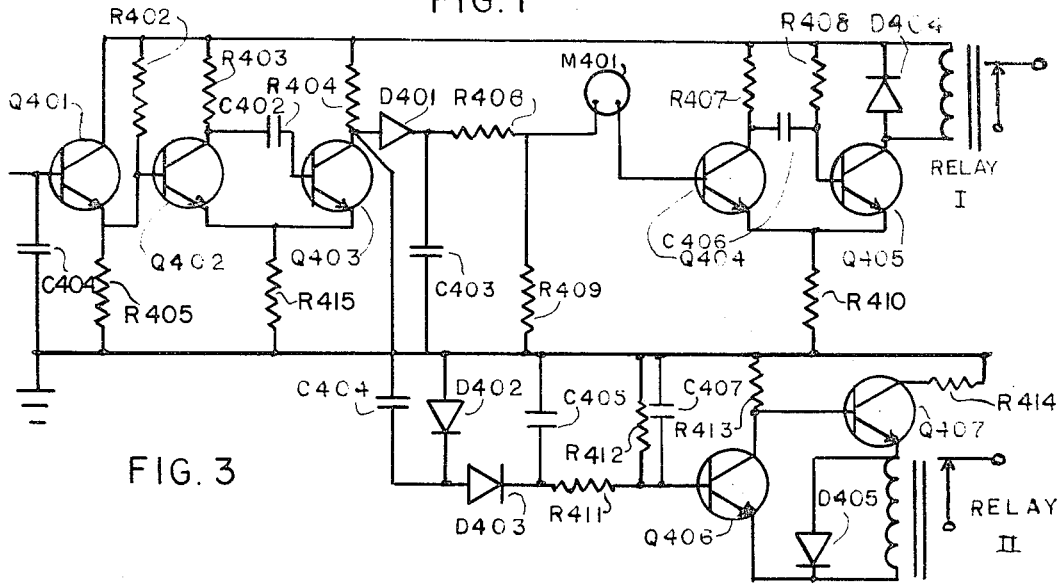
FIG. 3 is a schematic diagram of the control unit.

The output of the receiver is connected to the base of transistor Q401 of the control unit when the receiver is gated in the on condition. FIG. 3 discloses the control unit that is connected to the receiver output. It is of the same structure and arrangement as is disclosed in the U.S. Pat. No. 3,382,480. The transistor Q401 is connected to ground through capacitor C401 and its collector terminal is connected to the source of bias voltage. The emitter terminal is connected through resistor R401 to ground. A positive voltage in excess of the bias voltage will trigger the transistor Q401 into conductivity for a period as long as the positive voltage exists on it base terminal. This voltage exists only so long as pulse that is transmitted from the receiver to the transistor Q401. The capacitor C401 operates to require that the pulse amplitude level be at a predetermined level to raise the base voltage adequately to cause conduction in transistor Q401. This operates to eliminate the effect of much of the low amplitude pulses which come from the detection zone and which are of no interest.

The emitter of transistor Q401 is connected to the base terminal of transistor Q402, which is biased to cutoff by the voltage divider composed of resistors R402 and R401. When transistor Q401 conducts, it in effect short circuits the resistor R402. The transistor Q402 has its collector connected to the bias voltage through resistor R403 and connected to the base of transistor Q402 through capacitor C402. The base of transistor Q403 is also connected to the bias voltage through resistor R404 and the emitters of transistors Q402 and Q403 are connected together and through a resistor R405 to ground. The collector of transistor Q402 is connected to the bias voltage through resistor R405 and diode D401 and capacitor C404. The transistors Q402 and Q403 operate as a bistable multivibrator which when triggered by the pulses transmitted and amplified by transistor Q401 will produce a pulse of the proper amplitude and duration adequate to operate the counting mechanism.

The diode D401 is connected through a capacitor C403, resistor R406, network to the base of transistor Q404, which is biased to ground through the resistor R409. The collector terminal of the transistor Q404 is connected to a bias voltage through resistor R407 and its emitter terminal is connected through resistor R410 to ground. The output of transistor Q404 is connected from the collector thereof through capacitor C406 to the base of transistor Q405, the base thereof being biased through resistor R408. The collector terminal is connected to the biasing voltage through the relay winding of relay I which is shorted in one direction by the diode D404. The diode D404 permits the discharge of energy stored in the magnetic field of the relay when the exciting current is cut off. The emitter of transistor Q405 is also connected to ground through resistor R410.

When a vehicle is in the detection zone, a pulse will be received and gated from the receiver to the Transistor Q401. This operates the bistablemultivibrator having transistors Q402 and Q403, that produces a pulse of adequate amplitude and duration to trigger the multivibrator Q404 and Q405. The duration of the trigger pulse from the receiver and the degree of amplification in amplitude controls the charge built up on the capacitor C403 and the frequency of operation of the multivibrator Q404, Q405. It is desired that it have the highest possible frequency whereby a high counting rate can be obtained. In the present example a relay is illustrated as the counting device. It is contemplated that if a higher counting rate is desired than can be obtained from a relay that an electronic counter may be substituted for the relay devices. The Relay I counts all pulses from the detection zone having the proper amplitude including those from fixed structures as well as those from moving structure. To obtain an accurate count of the moving structures necessarily requires that a counter be included to count the pulses coming from immovable objects within the detection zone.

Capacitor C404 connects the output of the multivibrator Q402, Q403 to a network designed to count pulses that are repetative in nature, as for example those caused by reflections from immovable objects or structures within the detection zone. These pulses enter the network connected by capacitor C404. The network includes a pair of diodes D402, D403, capacitor C405, resistor R411 and R412 connected as shown to the base of transistor Q406. The base is connected to ground through capacitor C407, the collector to the source of bias voltage and the emitter to ground through resistor R413. The emitter is also connected to the base of the transistor Q407. Transistor Q407 has its emitter connected to ground through resistor R414 and its collector connected through the winding of the Relay II to the source of bias potential. The winding of the relay II is shunted by a diode circuit to permit the discharge of energy in the relay winding due to field collapse therein.

The network operates to provide a stairstep increase in charge voltage due to continuous reoccurrence of pulses from the immovable objects within the detecting zone. The charge voltage must build up to a predetermined level before there will be a triggering of the multivobrator Q406, Q407 to operate the relay II. The network is arranged to provide for a number of counts during each cycle dependent on the number of immovable objects in the detection zone in the absence of movable objects, Thus once the stairstep charge has reached the value to trigger the relay II it will continue to produce a triggering for each cycle for each movable object in the detection zone as the repetition rate is arranged to be adequate by reason of component values to maintain the network responsive to repetative pulses but not to pulses from movable objects.

When R411 is a variable resister, then the predetermined voltage can be varied, thus to operate relay II at different time setting. M401 is a tuning meter.

The control unit is shown and described merely as an example of one use for the output of the detector apparatus. It is contemplated that the apparatus may be used in connection with other apparatus, such as alarms, cathode ray tubes and switching means for controlling traffic.

Figure 4:
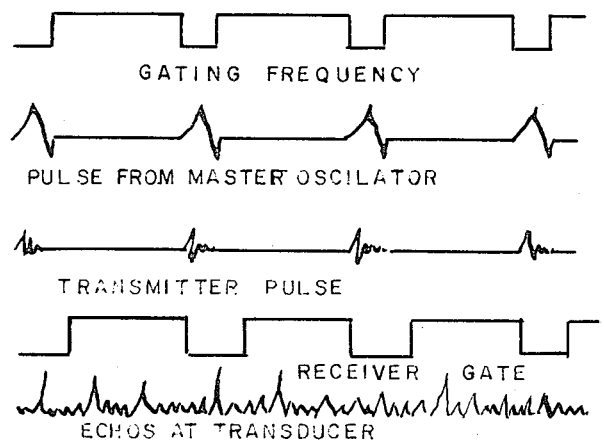
FIG. 4 is a chart disclosing the timing relationship of operation of the transmitter, receiver and transducer.

FIG. 4 shows a chart of waves to represent what takes place in different portions of the apparatus and the relative timing of the events. The upper wave form represents the output from the timing unit to the transmitter for keying the master oscillator into operation. The oscillator is keyed into operation during the minimum voltage portion of said wave and is keyed off during the maximum portion of the voltage wave. The second wave form from the top of the chart shows the pulse from the master oscillator occuring during the time period when the timer is producing a minimum voltage in the keying circuit. The third wave form shows the pulse transmitted to the transducer and projected toward the detection zone. The fourth wave form shows the voltage wave for gating the receiver output. The gating voltage peaks of this rectangular wave occurs during the period when the master oscillator is keyed off. The bottom wave form represents the pulses at the output of the receiver. Note that they occur all during the cycle. The gating of the output of the receiver eliminates those pulses that arrive during the period while the receiver output gate is closed. The pulses of greatest amplitudes represent the pulses from object within the detection zone when they arrive at the receiver during the gating period of the receiver. Those arriving at other times come from objects outside the detection zone and are rendered ineffective upon the counter by the gating of the receiver. The low amplitude pulses, represent noise due to multiple reflections of the incident pulses. Because they travel greater distances in the atmosphere they are attenuated more than those pulses that are reflected directly from vehicles. The effect of the noise pulses can be materially reduced by the adjustment of the power output of the transmitter and the gain of the receiver. This adjustment can be made simultaneously because the potentiometers controlling the power output of the transmitter and the gain of the receiver are ganged together. The high amplitude pulses though reduced by this adjustment still have adequate amplitude to be registered.

The apparatus operates as above described during the disclosure of the structure. The improvements within the apparatus enables the apparatus to have greater universality of utility, as it provides for adjustment of the apparatus to the requirements of the detection zone in which it is to be used. The timer is adjustable to provide for different widths of the pulses and for different frequencies. This enables the apparatus to be used in detection zones having greater ranges, wherein a longer period is required for the incident wave to impinge on the vehicle and the echo pulse to reach the transducer. The timer is adjustable to provide for timing the onset of the gating of the receiver output to the counter apparatus and for adjusting the length of the gating period. This enables the detection zone to be defined with greater accuracy, as it not only defines the outter boundary of the zone but also the nearer boundary.

The power of the transmitter and the gain of the receiver can be simultaneously controlled whereby to change the sensitivity of the apparatus according to the requirements of the enviroment of the detection zones wherein the detector apparatus is to be used.

These features and others as may appear from the disclosure make for an apparatus that is reliable in operation and one that is adjustable to multiple conditions.

The ganging of the control of the transmitter power and the receiver gain provides for greater convenience in the adjustment of the sensitivity of the apparatus.

Having disclosed my invention and the best mode of its utilization what I consider to be my invention is set forth in the following claims.

1. Apparatus for detecting movable objects within a detection zone comprising
   a transmitter for generating an electric signal of ultrasonic frequency having; power output control means; and
   means for pulsing said transmitter to produce short pulses of said electric signal energy;
   timing means for adjustably determining the frequency of said pulses and the width of said pulses;
   transducer means for converting the pulses of electric signal energy into pulses of mechanical wave energy, and for converting mechanical wave energy into energy;
   a receiver apparatus for amplifying said electric signal energy from said transducer having means for adjusting the gain of said receiver and gating means at its output;
   counting means connected to the output of said receiver;
   means in said timing means for providing gating voltage to said receiver gating means, having means for selectively adjusting the onset of said gating voltage and the duration thereof to limit the response of the counter to pulses arriving at the receiver output to a definite time period during each cycle and
   means connecting the power output control means of said transmitter and the gain control means of said receiver for selectively adjusting the sensitivity of the apparatus to the detection zone conditions in which it is used.

2. Apparatus for detecting movable objects in a detection zone comprising;
   a transmitter having, a master oscillator for generating an electric signal of an ultrasonic frequency, means for keying said oscillator into activity for short periods to form pulses of electric energy, a driver stage, a power amplification stage and control means between said driver stage and said oscillator for selectively adjusting the power output of said transmitter;
   a timer apparatus having, means to generate a control voltage wave at a predetermined frequency for keying said oscillator into activity, means to selectively adjust the period and frequency of said voltage wave and means to develope a gating voltage having means to adjust the onset of said gating voltage and the duration thereof;
   a transducer connected to said transmitter for receiving electric energy pulses therefrom and converting said pulses to pulses of ultrasonic mechanical wave energy and for converting echos of mechanical wave energy into electric signal energy;
   A receiver connected to said transducer for amplifying said electric signal energy therefrom having means to control the gain of the receiver and means for gating the output thereof;
   counting means connected to said receiver for registering the objects passing through the detection zone;
   means connecting the timing means to said gating means to limit the response of said counting means to the period in which said gating means is open; and
   means connecting the power control means of said transmitter and the gain control means of said receiver for adjusting the sensitivity of the detecting apparatus for the conditions existing in the detection zone to reduce the effect of noise.

* * * * *